United States Patent
Georgadze et al.

(10) Patent No.: US 11,774,626 B2
(45) Date of Patent: Oct. 3, 2023

(54) METHOD AND APPARATUS FOR DETECTION AND/OR IDENTIFICATION OF MATERIALS AND OF ARTICLES USING CHARGED PARTICLES

(71) Applicant: GScan OÜ, Tallinn (EE)

(72) Inventors: Anzori Georgadze, Tallinn (EE); Madis Kiisk, Tallinn (EE); Mart Magi, Tallinn (EE); Egils Avots, Tartu (EE); Gholamreza Anbarjafari, Tartu (EE)

(73) Assignee: GSCAN OÜ, Tallinn (EE)

( * ) Notice: Subject to any disclaimer, the term of this patent is extended or adjusted under 35 U.S.C. 154(b) by 635 days.

(21) Appl. No.: 16/977,293

(22) PCT Filed: Mar. 4, 2019

(86) PCT No.: PCT/EP2019/055333
§ 371 (c)(1),
(2) Date: Sep. 1, 2020

(87) PCT Pub. No.: WO2019/166669
PCT Pub. Date: Sep. 6, 2019

(65) Prior Publication Data
US 2021/0003735 A1    Jan. 7, 2021

(30) Foreign Application Priority Data
Mar. 2, 2018 (GB) ..................... 1803426

(51) Int. Cl.
*G01V 5/00* (2006.01)
(52) U.S. Cl.
CPC ................. *G01V 5/005* (2013.01)
(58) Field of Classification Search
CPC ..................................... G01V 5/005
See application file for complete search history.

(56) References Cited

U.S. PATENT DOCUMENTS 7,531,791 B2 * 5/2009 Bryman ............... G01T 1/203
250/266
7,633,062 B2   12/2009 Morris et al.
(Continued)

FOREIGN PATENT DOCUMENTS

WO   WO 2015/057973 A1   4/2015
WO   WO 2016/025409 A1   2/2016
WO   WO 2016/033564 A1   3/2016

OTHER PUBLICATIONS

Blanbied et. al, Nuclear Instruments and Methods in Physics Research A, 784 (2015) 352-358.
(Continued)

*Primary Examiner* — Nicole M Ippolito
(74) *Attorney, Agent, or Firm* — Craig A. Fieschko, Esq.; DeWitt LLP (57) ABSTRACT

A method of detecting and/or identifying a material or article in a volume of interest, comprises: a) detecting, with an input hodoscope, charged particles entering the volume of interest, b) detecting, with an output hodoscope, charged particles leaving the volume of interest, c) associating particles leaving the volume of interest with particles entering the volume of interest and determining therefrom a set of completed trajectories for the particles, d) performing filtering based on the deflections of the particles with completed trajectories, e) calculating a volume density map based on the filtered completed trajectories which passed through each respective voxel, the map representing a number of completed trajectories and/or a total scattering angle; and f) detecting and/or identifying the material or article in the volume of interest from the volume density map.

12 Claims, 5 Drawing Sheets

(56) References Cited

U.S. PATENT DOCUMENTS

| | | |
|---|---|---|
| 9,841,530 B2 | 12/2017 | Blanpied et al. |
| 2008/0265156 A1 | 10/2008 | Morris et al. |
| 2008/0315091 A1 | 12/2008 | Morris et al. |
| 2010/0065745 A1 | 3/2010 | Goldberg et al. |
| 2010/0295689 A1 | 11/2010 | Armistead, Jr. et al. |
| 2015/0108349 A1 | 4/2015 | Bendahan et al. |
| 2015/0325013 A1 | 11/2015 | Patnaik |
| 2016/0041297 A1 | 2/2016 | Blanpied et al. |
| 2016/0061752 A1 | 3/2016 | Kurnadi et al. |

OTHER PUBLICATIONS

Borozdin et. al, Radiographic imaging with cosmic-ray muons, Nature (2003), vol. 422, Iss. 6929, p. 277.

Pesente S et al., "First results on material identification and imaging with a large-volume muon tomography prototype," Nuclear Instruments & Methods in Physics Research, section A, Elsevier BV North-Holland, NL, vol. 604, No. 3, Jun. 2009 (Jun. 11, 2009), pp. 738-746 (XP026129784), ISSN: 0168-9002, DOI: 10.1016/J.NIMA.2009.03.017.

North-Holland, NL, vol. 604, No. 3, Jun. 11, 2009 (Jun. 11, 2009), pp. 738-746 (XP026129784), ISSN: 0168-9002, DOI: 10.1016/J.NIMA.2009.03.017.

Hoch, Richard Claude, "Advances in Cosmic Ray Muon Tomography Reconstruction Algorithms".

Schultz et al., IEEE Nuclear Science Symposium (2006), "ML/EM Reconstruction Algorithm for Cosmic Ray Muon Tomography", pp. 2574-2577 (XP031083881).

Mitra et al., IEEE Nuclear Science Symposium and Medical Imaging Conference (2014), "A volume clearing algorithm for Muon Tomography", pp1—3 (XP 032880166).

Schultz et al., Nuclear Instruments & Methods in Physics Research A (2004), vol. 519, "Image reconstruction and material Z discrimination via cosmic ray muon radiography", pp. 687-694 (XP004492327).

International Preliminary Report on Patentability, PCT/EP2019/055333, dated May 26, 2020.

* cited by examiner

METHOD AND APPARATUS FOR DETECTION AND/OR IDENTIFICATION OF MATERIALS AND OF ARTICLES USING CHARGED PARTICLES

FIELD OF THE INVENTION

The invention relates to systems, devices and processes for detection and/or identification of articles using charged particles, for example based on cosmic ray tomography.

BACKGROUND OF THE INVENTION

Cosmic-ray tomography for detecting special nuclear materials for security and border control applications was proposed for the first time in early 2000's. The first paper that proposed the use of muon deflection in tomographic imaging, was published by Borozdin et. al Radiographic imaging with cosmic-ray muons, Nature. (2003), Vol. 422. Iss. 6929, P. 277. in 2003. Cosmic-ray muon tomography makes use of the effect of muon deflection and its dependence on atomic number to measure the areal density along the muon's path and to determine the elemental composition.

Subsequently, U.S. Pat. No. 7,633,062 disclosed muon tomography based on the coulombic scattering effect. Further advancements related to assessing the momentum of the entering particles by using three detector planes and applying the statistical maximum likelihood/expectation maximizing method for track reconstruction, etc. Identification of objects with medium and heavy atomic number Z range (e.g. iron, tungsten, lead, SNM) was discussed.

In 2015 Blanbied et. al. Nuclear Instruments and Methods in Physics Research A, 784 (2015) 352-358 described how material discrimination can be achieved using deflection and stopping of cosmic ray muons and electrons. The method is stated to differentiate heavier from lighter metals as well low-atomic weight materials. The method introduces a parameter "stopping power", in order to determine first the type of material and then the thickness of the material. See also WO-2016/025409.

Further particle detecting methods and apparatus are disclosed in the following patent documents: US 2010/065745 A1, US2008/315091 A1, WO2015/057973 A1 and US2015/325013 A1 and in the following articles: IEEE Nuclear Science Symposium (2006), Schultz et al., "ML/EM Reconstruction Algorithm for Cosmic Ray Muon Tomography", pp 2574-2577 (XP031083881), and Nuclear Instruments & Methods in Physics Research A (2004), vol. 519, Schultz et al., "Image reconstruction and material Z discrimination via cosmic ray muon radiography", pp 687-694 (XP004492327), and IEEE Nuclear Science Symposium and Medical Imaging Conference (2014), Mitra et al., "A volume clearing algorithm for Muon Tomography", pp1—3 (XP 032880166).

SUMMARY OF THE INVENTION

Aspects of the present invention seek to provide another approach and improved methods and apparatuses for detecting and/or identifying a material and/or one or more articles in a volume of interest. The term article includes all types of objects, including objects being carried by people.

According to a first aspect of the invention, there is provided a method of detecting and/or identifying a material or article in a volume of interest, the volume of interest including a plurality of voxels, the method including:

a) detecting, with an input hodoscope, charged particles entering the volume of interest;

b) detecting, with an output hodoscope, charged particles leaving the volume of interest;

c) associating particles leaving the volume of interest with particles entering the volume of interest and determining therefrom a set of completed trajectories for the particles;

d) performing filtering based on the deflections of the particles with completed trajectories;

e) calculating a volume density map based on the filtered completed trajectories which passed through each respective voxel, the map representing a number of completed trajectories and/or a total scattering angle; and f) detecting and/or identifying the material or article in the volume of interest from the volume density map.

The filtering procedure is a preparation step for generating the volume density map by using back projection.

In one preferred method, step d) filtering is performed on the deflection angles of the particles in the input and/or the output hodoscopes.

As an alternative to the above preferred method or in addition in step d) filtering is performed based on the total scattering angle of particles in the volume of interest.

The volume density map may be calculated using back projection of the filtered completed trajectories.

The general principle is that we count any physically measured parameter (counting trajectories) or count any parameter that are derived from physical measurements (total scattering angle) into all voxels the particle passed through. In the reconstruction procedure we treat these parameters equally.

We get as many volume density maps as we decide by back projecting the trajectories from the measured point to entering point for each trajectory with the identical procedure, and it is not dependent whether our measured parameter is a number of completed trajectories/per voxel or sum of total scattering angle/per voxel. Each particle contains always an information about its trajectory through the VOI and the total scattering angle in VOI, therefore we can use one or both physical parameters to construct the volume density map. According to the algorithm, each track contributes one count to each voxel it passes through. It also contributes the value of total scattering angle to each voxel it passes through. We then sum the number of trajectories in each voxel and arrive to volume density map that represents differences in particles physical absorption throughout the VOI. In parallel we also count and sum the total scattering angles in each voxel or use the average of the total scattering angles for each voxel (but one can use alternatively other scattering describing parameters, e.g. median, sum of angles, etc.) and arrive to a volume density map that represents differences in physical scattering processes throughout the VOI. These two volume density maps can be constructed for any filtering options, filtering in hodoscope(s), in VOI or any combinations of different filtering options. It means that though we have two principle physical parameters received from measurements, we can have many more volume density maps due to different filtering conditions.

The counted data in any voxels will be summed and can be further manipulated, e.g. averaged values can be used. The choice depends on what parameter suits best for tomographic reconstruction. For example, use of average scattering angle instead of sum of total scattering angles normalises uneven track distribution in the VOI and is therefore preferred.

It is to be noted that the total scattering angle in VOI can be used for two procedures: 1) it is used as a filtering parameter, then it influences the choice of what particular trajectories are selected to construct the volume density map; 2) In another aspect the total scattering angle is used as a parameter to construct the volume density map itself. Preferably both procedures are adopted. Firstly we do the filtering according to the total scattering angle in VOI and then use filtered trajectories to construct volume density map.

Detecting the material or article in the volume of interest preferably includes determining geometrical properties of the material or article in the volume of interest.

In preferred methods; a plurality of volume density maps are determined using different sets of filtering parameters. This serves to improve the discrimination of the method.

The method may further comprise:
f) defining a region of interest corresponding to the material in the volume of interest;
g) producing a first distribution function relating to the region of interest from the volume density map.

The method may additionally comprise:
h) recognising at least one feature of the first distribution function to identify the material in the volume of interest.

Each particle has an associated deflection angle in the hodoscope, and in operations (c) and (d) and (e) the set of completed trajectories may consist of completed trajectories having associated deflection angles within a specific range of deflections.

The range or ranges of deflection angles may be such that the electrons and muons are at least partly separated. For example the method may include selecting the range or ranges of deflection angles such that the electrons and low-momentum muons are separated from higher momentum muons. The low-momentum muons may have an energy up to 500 MeV.

In preferred embodiments, total deflection angles for completed trajectories within hodoscopes and VOI below a certain threshold are counted as non-deflected and treated as straightforward trajectories.

According to a second aspect of the invention, there is provided a detection and/or identification assembly, including:
an input hodoscope adjacent a volume of interest, the volume of interest including a plurality of voxels and the input hodoscope being configured to detect charged particles entering the volume of interest;
an output hodoscope bounding the volume of interest, the output hodoscope being configured to detect charged particles leaving the volume of interest;
a processor configured to receive detection data from the input and output hodoscopes configured to:
associate particles leaving the volume of interest with particles entering the volume of interest and determine therefrom completed trajectories; perform filtering based on the deflection angles of the completed trajectories;
calculate a volume density map, based on the filtered completed trajectories which passed through each respective voxel, the map representing a number of completed trajectories and/or a total scattering angle; and
detect and/or identify a material or an article in the volume of interest from the volume density map.

The processor may be configured to perform filtering based on the deflection angles of the particles in the input and/or the output hodoscopes and/or based on the total scattering angle of particles in the volume of interest.

According to a third aspect of the present invention there is provided a program for performing the method of any preceding claim when executed by a computing device.

In some embodiments, the computing device can be configured to receive the data over a remote connection and/or from electronic storage.

In some embodiments, the computer program can be run at a different location and/or at a different time from the detection of radiation by the detector assemblies.

Any features, including optional features, of the method of the first aspect can also be used for the second and third aspects.

According to a fourth aspect of the invention, there is provided a computer readable medium incorporating a computer program according to the third aspect.

A method is described herein to detect and identify hidden objects, in some embodiments particularly those composed of mainly, but not limited to, light elements within other common materials of low atomic number. Such method can be based on cosmic ray charged lepton tomography and can be used for example in scanning of passenger luggage, suitcases, bags, cargo and sea containers and the like. It can also in some instances be used to scan humans and animals.

BRIEF DESCRIPTION OF THE DRAWINGS

Preferred embodiments of the invention are described below, by way of example only, with reference to the accompanying drawings, in which.

DETAILED DESCRIPTION OF PREFERRED VERSIONS OF THE INVENTION

It is to be appreciated that certain embodiments of the invention as discussed below may be incorporated as code (e.g., a software algorithm or program) residing in firmware and/or on computer useable medium having control logic for enabling execution on a computer system having a computer processor. Such a computer system typically includes memory storage configured to provide output from execution of the code, which configures a processor in accordance with the execution. The code can be arranged as firmware or software, and can be organized as a set of modules such as discrete code modules, function calls, procedure calls or objects in an object-oriented programming environment. If implemented using modules, the code can comprise a single module or a plurality of modules that operate in cooperation with one another.

Physical Principles

Secondary cosmic ray electrons/positrons interact predominantly with electrons in the atomic shell. Stopping power (or alternatively used term, energy loss) of a charged particle is a random process of continuous energy transfer through ionization process with atomic electrons. A group behaviour of an electron beam can be characterized by the following parameters: stopping power, range, lateral and longitudinal straggling. These characteristics determine the method to be applied for electron tomography.

In the case of an electron beam, the energy loss via bremsstrahlung becomes important at energy range above about 10 MeV (for heavier elements).

Due to the fact that $m_e$ is small, deflection of the particle's track trajectories are considerable. However, it can be shown with Monte Carlo simulations that track trajectories above 5 MeV can be approximated in certain applications to straight lines or small deflections can be taken into account. Backscattering is important at low energies (below few Mev) for electrons, but becomes negligible above 5 MeV for materials composed of light elements.

Muon scattering can be approximated to Gaussian distribution.

Detection Method

The purpose of the method described, is to identify mainly, but not limited to, materials composed of low-Z elements within a moderate size of closed volume (CV) such as an example of personal luggage or cargo container. The method relies on tomographic measurements of cosmic ray charged leptons based on attenuation and coulomb scattering of charged leptons in the material. However, other types and sources of charged particles may be employed, such as artificial sources, but cosmic ray particles have the advantage of a high-energy spectrum and being freely available.

A certain fraction of particles will be attenuated in the CV, and a certain fraction will be transmitted through the CV (outgoing particles). A certain scattering distribution of particles will be obtained in the CV.

Charged leptons leaving the volume of interest can be associated with charged leptons entering the volume of interest from which can be determined a set of completed trajectories, that is a set of trajectories that charged leptons leaving the volume of interest took as they passed through the volume of interest.

The volume of interest (VOI), including the CV, is divided into elementary volumes, called voxels. In embodiments of the invention, objects are identified in the volume of interest (VOI) by a tomographic object reconstruction method relying on spectrometric filtering (discriminating) of muon and electron components, e.g. lower and higher momentum components of the secondary lepton ray flux based on deflection angles in the hodoscopes. The object reconstruction is done by using back-projection. However, back projection can be replaced with other tomographic reconstruction methods. The spectrometric discrimination allows an approximated separation of high energetic leptons from low energetic leptons, grouping the lepton flux based on the distribution of angular deflection in the hodoscopes.

For object localization, the VOI is subdivided into elementary volumes—voxels. Each track of particle is associated with all voxels it passes through by back projecting the projected tracks. Different spectral regions are treated separately to construct multiple volume density maps or a combination thereof. In each voxel, the number of tracks of transmitted particles, that is of particles which have completed trajectories passing through that voxel, are counted. A "hit map" (volume density map) can thereby be reconstructed to locate objects in the VOI. Furthermore, the volume density map can be based on and refer to any of the measured parameter such as counts of completed trajectories, total scattering or parameters derived from the measured parameters (e.g. mean scattering angle per voxel, median scattering angle etc.).

An optional additional method may be employed to optimize the detection sensitivity for the object recognition by introducing an additional filtering process to the trajectories by their deflection angle in the VOI. An algorithm, called Trajectory Deflection Correction, can be applied to correct and increase the accuracy in determination of deflection angles in hodoscopes for high momentum leptons. The purpose of this method is to assign the track as a non-deflected path for the corrected trajectories if the completed trajectory throughout the tomography system does not exceed a certain deviation threshold value that is linked to the detection accuracy of the deflection angles.

Furthermore, obtained distribution functions can be associated with the material and its density filling the volume of the voxel, in particular those voxels in a region of interest in which the detected material is located. One or more features of the distribution function can be recognised in order to identify the material. For example, statistical features, (such as the obtained count rate, scattering angle and their distribution functions) as training data, can be fed into a supervised machine-learning algorithm, as an example a probability distribution function (PDF) based classification with KLD as discrimination function. Once the training is done, the automatic system is ready to classify objects existing within the VOI.

Description of the Tomography

Figure 1:
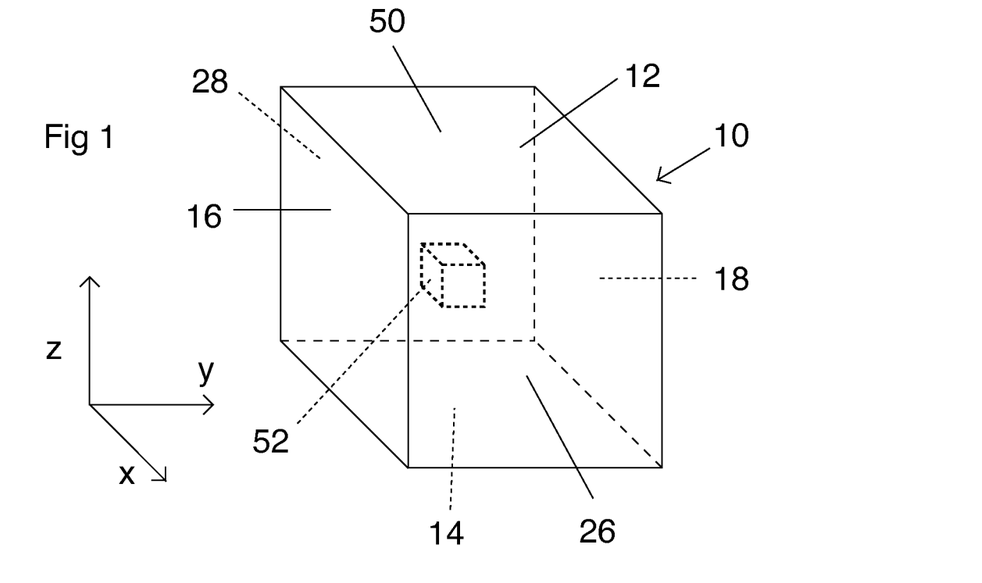
FIG. 1 shows a perspective view of detector apparatus in accordance with an embodiment of the invention with horizontal and vertical hodoscopes and the object to be identified located in the centre of the VOI.

FIG. 1 shows the tomographic setup of a detector 10 based on input and output detector assemblies, in the form of two XY position-sensitive hodoscopes 12, 14 and two XZ position-sensitive hodoscopes 16, 18 shown in FIG. 1.

The tomography detector 10 includes upper 12 and lower 14 hodoscopes, merged together with two side hodoscopes 16, 18. Two sides 26, 28 of the system remain open for inserting and removing the objects or articles 52 to be scanned. The hodoscopes bound the volume of interest 50.

The overall size of the VOI of the detector 10 can be for example 1 m×1 m×2 m, although this can of course be varied in dependence on the size of items to be scanned. In this embodiment, the external dimensions of the detector 10 are 1.4×1.4×2 m.

Figure 2:
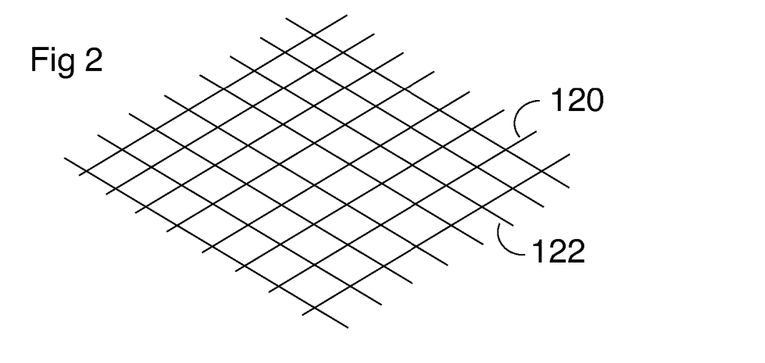
FIG. 2 is an illustration of the layout of two-layered, position sensitive detector plane.

In the present embodiment of the detection setup, each hodoscope 12, 14, 16, 18 is made of 3 layers, each comprising orthogonal detection plates providing the X, Y, Z-coordinates to the particles tracks. Thus the three layers in each of four hodoscopes provide in this embodiment twelve detection panels. The layers may comprise double or multilayers of position sensitive detector panels. For example, a position sensitive detector panel can be constructed by 1×1 mm² thick plastic scintillation fibres, two layers 20, 22 placed orthogonally to each other as shown in FIG. 2.

Each of the twelve detection panels is segmented for example into 1000 scintillation fibres per metre that detect scintillation light and transport the photons to photo sensors placed at both fibre ends. The pitch of fibres can be selected as appropriate but is typically 1 mm.

A coincidence mode data acquisition system is used.

Locating Trajectories in Hodoscopes and VOI

Figure 3:
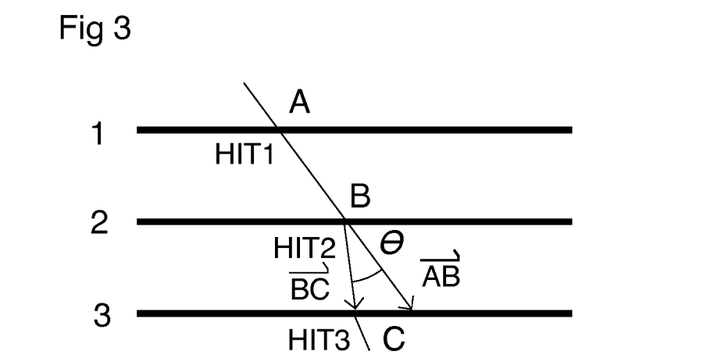
FIG. 3 is an illustration of the definition of the deflection angle in the hodoscope.
Figure 4:
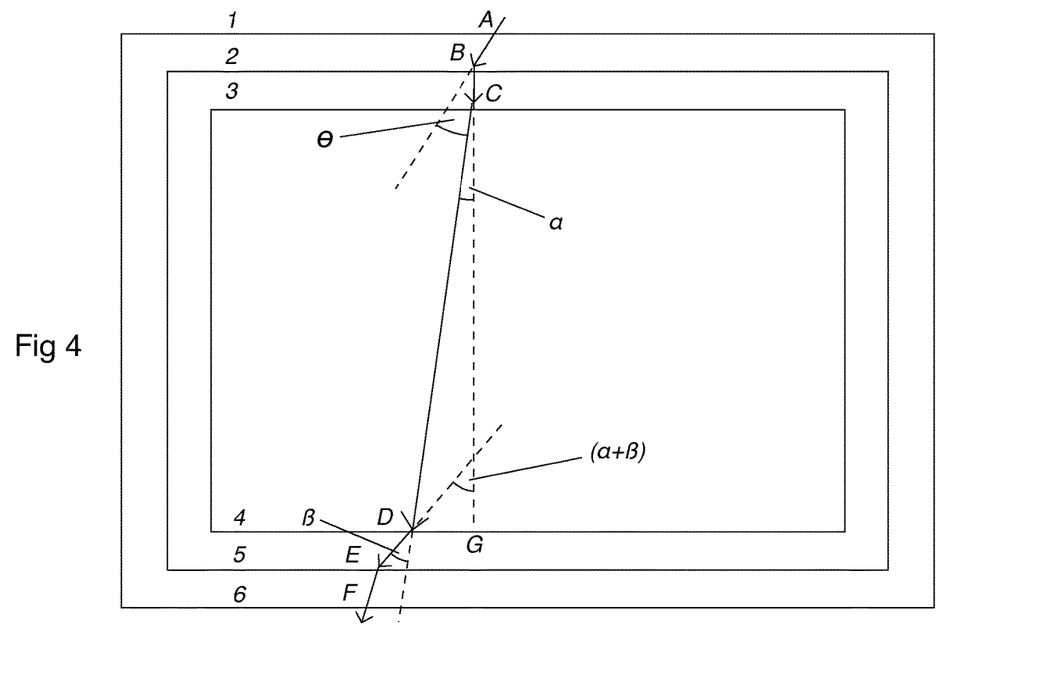
FIG. 4 shows the trajectory of the particles through the voxelised VOI and performing the operation of back projection using the parameter of total scattering in the VOI defined as the sum of scattering angles of $\alpha+\beta$.

FIGS. 3 and 4 show the deflection angles of the particles as they pass through the detector 10. The entering trajectory of the particle is shown at the top of FIG. 4, and the exiting trajectory of the particle is shown at the bottom of FIG. 4:

In FIG. 4:
A, B, C, D, E, F—measured particle hit coordinates
G—Imaginary coordinate of the extension of the entering trajectory of the particle, would be a hit coordinate if no deflections take place in the VOI
AB—initial entering trajectory
BC—trajectory deflected in hodoscope
θ—Deflection angle of the deflection in the hodoscope
CD—defined trajectory (standard definition) through the VOI
DE—definition of the exiting trajectory
Sum of (α+β)—total scattering angle in VOI, sum of all scatterings (deflections) taking place in VOI.
(α+β)—is also the angle between trajectories BC and DE
CG—extended line of the entering trajectory Total scattering angle for VOI can be in principle be defined alternatively also not as between trajectories BC and DE but for example between AC and DF or between fitted line (e.g. least squared fit) ABC and DEF.

The actual (most likely lightly curved) trajectory is never known and cannot be measured. The constructed trajectory in VOI is back projected and for all voxels it passes, we associate the total scattering angle as in the illustration or associating just the count number to each voxel. If this back projection is done for all measured particles entering in all different directions, we get counts (or scattering angles) in most of the voxels and the volume density map is constructed.

Charged leptons, in particular of cosmic rays, entering the volume of interest 50 are detected, and their trajectories are determined by the position sensitive hodoscope through which they first pass, which can be considered the input hodoscope.

The two hits on two orthogonal scintillation fibres in a detector panel defines one location (hit) point. Based on the hits in the outer two detector layers 1, 2, FIG. 4 of the input hodoscope, the initial trajectory vector AB can be defined. Based on the hits in the inner two layers 2, 3, the trajectory vector BC can be defined and the deflection angle for the two vectors can be calculated. The vector BC, is also considered as the trajectory of the lepton entering the VOI.

Track trajectories for initial, entering particles, that is for charged leptons entering the volume of interest, and for outgoing particles (charged leptons leaving the volume of interest), are determined.

The following formula is used for angle calculations. The inputs are two vectors which have x, y and z coordinates. The vectors are arranged so that, when there is no deflection, the angle is 0 degrees. The inputs are points $A(x_A, y_A, z_A)$, $B(x_B, y_B, z_B)$ and $C(x_C, y_C, z_C)$ and the angle in degrees is calculated using the following formulas $$\vec{AB} = B - A$$
$$\vec{BC} = C - B$$
$$\theta = \tan^{-1}\left(\frac{\|\vec{AB} \times \vec{BC}\|}{\vec{AB} \cdot \vec{BC}}\right)$$

It is important to note that one can define the deviation from straight path in different ways. In other words, any parameter describing the deviation from the straight line can be used.

Trajectories in the VOI are calculated in a similar way. However, in this instance, the entering trajectory is defined as vector BC and the trajectory leaving the VOI is defined as vector DE (FIG. 4). The vector CD based on the hits in the inner two layers is considered as the trajectory of the lepton in the VOI.

However, in other arrangements, one can define the particle's trajectory in the VOI as vector CG and the trajectory of leaving the VOI as vector GE. It has been shown with simulations that in case of high-Z materials, this trajectory improves the performance of object reconstruction.

In other arrangements, the deflection angle in the VOI is defined as the angle between the vector of the entering trajectory and the exiting trajectory of the particle. In other words, the deflection angle in the VOI is the angle between the trajectory based on the hits in the inner two detector layers 32, 33 of the input hodoscope and the trajectory based on the hits in the inner two layers 4, 5 of the output hodoscope.

Only trajectories exiting the VOI (i.e. completed trajectories) are used in further tomographic object reconstruction.

Tomographic Reconstruction

In order to achieve sufficient object reconstruction efficiency for low-Z materials, one can divide the cosmic ray spectra according to the deflection angle α in the hodoscope shown in FIG. 4. The cost function is defined based on angular distribution of hodoscope and/or VOI so that the sensitivity of the reconstructed VOI is maximized. In other words, initialization values for thresholds of the deflection angles (lower and/or upper) for object reconstruction are set. The aim is to separate the fraction of the lepton flux with columbic scattering on nucleus from the fraction that can be characterized by attenuation, i.e. in order that the attenuation is determined by calibrated variations in transmission in VOI.

Figure 5:
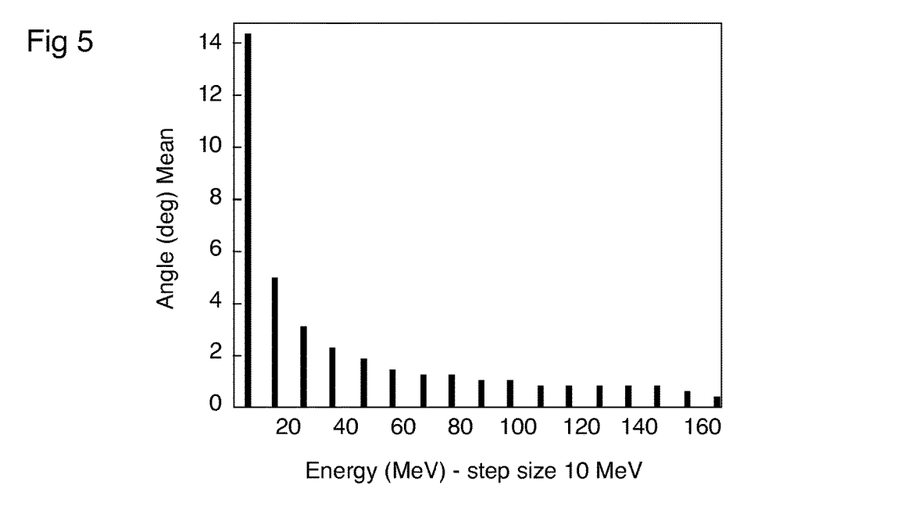
FIG. 5 shows energy dependence of the mean deflection angle of electrons in the hodoscope (the detector plates having a total thickness of 2 mm, the volume between detectors plates being filled with air)

In other words, the detection sensitivity of the object reconstruction and the identification can be increased by spectrometric filtering of the trajectories or tracks according to their deflection angle. By filtering out certain group of leptons with certain ranges of deflection angle (corresponding statistically on the average momentum of leptons), one can separate the attenuation and scattering effects. For small deflection (high momentum) angles, the attenuation effect is negligible and the scattering effect dominates. For highly deflected (low momentum) particles, the attenuation effect dominates. For intermediate deflection angles, mixed particles of low momentum muons and high momentum electrons can be grouped. An advantageous way, but not the only way, to do spectrometric filtering of different groups is by deflection angles, because it is correlated with energy and the average scattering angle. An illustration of the deflection angle dependence on the kinetic energy of the electron is presented in FIG. 5. It represents the conditions of a hodoscope with three detector plates at 10 cm distance from each other and the total thickness of one plastic scintillation detector plate is 2 mm. The space between the detectors plates is filled with air.

In many cases, when there is no presence of heavy-element objects, high energy muons reduce the difference in density between voxels of the object and its surrounding volume. However, in the case of heavy, large objects it is desirable to omit low energy particles from the calculation. Conversely, by filtering out low momentum particles, a "cleaner" scattering distribution can be obtained. Accordingly, detection sensitivity of the object reconstruction and the identification can be increased by using an additional method of filtering the trajectories according to their deflection angle in hodoscopes and/or the VOI. As described above, the deflection angles in the hodoscopes and in the volume can be determined using vector algebra and the geometrical information of the hits recorded by the hodoscopes. An algorithm can autonomously sort and filter tracks and apply multiple filtering by hodoscopes and/or volume.

Figure 6:
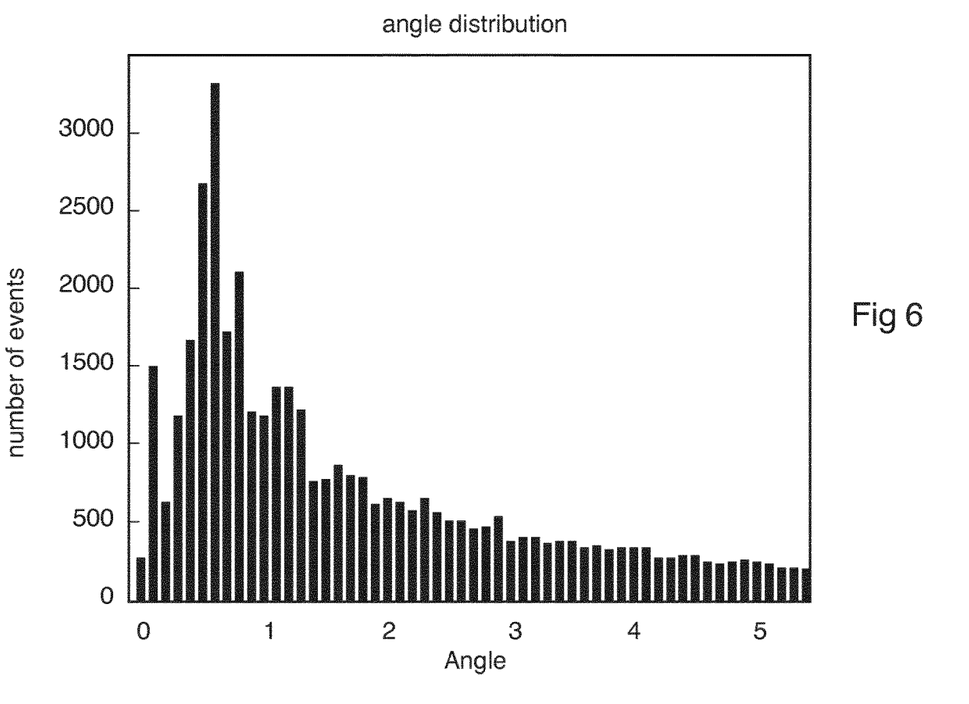
FIG. 6 shows the angular distribution of electrons in the hodoscope for the completed trajectories passing through the VOI.
Figure 7:
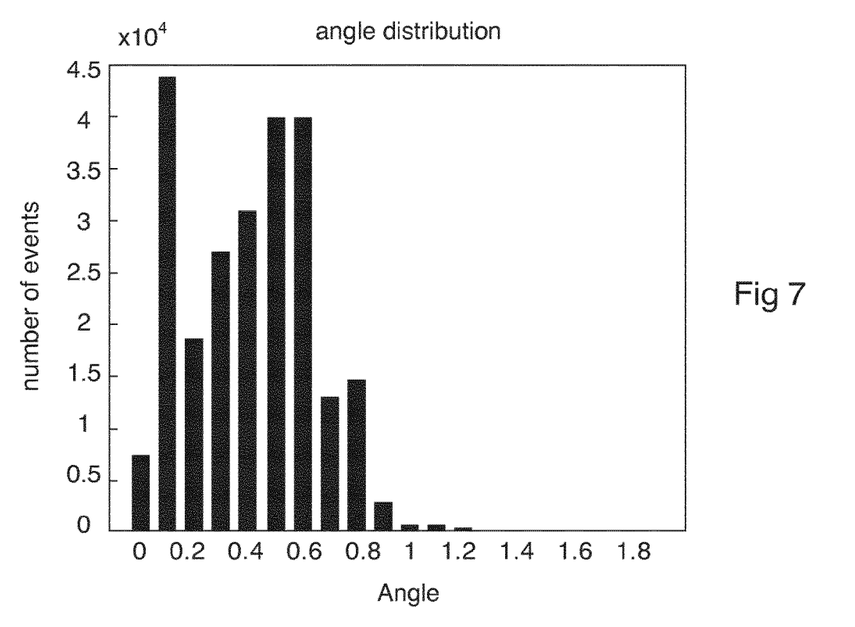
FIG. 7 shows the angular distribution of muons in the hodoscope for the completed trajectories passing through the VOI.

The range of the charged leptons in matter is dependent on the initial energy of the particle. By filtering certain range of trajectories, one can maximize the difference in attenuation of particles between objects with different densities. Angular distribution of the electron and muon flux as a function of the mean deflection angle in the input hodoscope for particles passing through the VOI, are shown in FIGS. 6 and 7. Filtering selectivity depends on detector spatial resolution and detector thickness.

By selecting an optimum angular range of the deflected particles, in other words by only considering particles associated with a specific range of deflection angles (that is a specific range of deflection angles in the hodoscope and/or in the VOI), the differences in density or scattering distributions of the object and the surrounding objects or matter can be maximized.

Filtering can be done at the input hodoscope, at the output hodoscope or at a combination of both. The sequence filtering can mean filtering of sorted track first by input hodoscope, tracks passing first filtering step are then directed to the next filter in VOI or output hodoscope. Filtering conditions can have either upper and lower angular thresholds or only one of the thresholds. Particle events are retained if they meet deflection or filtering thresholds. In sequence, all filtering steps must satisfy all angular threshold values in each individual step.

Thus the procedure for spectrometric filtering can be summarised as follows:
(i) Calculate deflection angles in hodoscopes to the tracks with completed trajectories as defined in section "Locating trajectories in hodoscopes and VOI";
(ii) Construct spectral distribution representing the deflection distribution in hodoscope(s);
(iii) Determine spectral distribution for muons and electrons/positrons given the specific spectral distribution and resolution of a detection system, obtained from computed simulations and/or experimental data;
(iv) Determine experimentally the optimum division of the deflection spectrum for object reconstruction.

Object Localisation and Reconstruction

Using information about the electrons, positrons and muons that do not significantly change their trajectory in low z-material it is possible to locate objects within the volume.

By dividing the VOI into planes with a fixed distance therebetween, it is possible to calculate the coordinates of the beam plane intersection. To constrain the results to finite values, the volume is divided in a three-dimensional grid. The grid values are used to approximate the beam plane intersection coordinates to the closest grid (i.e. voxels) value.

The loss of intensity for the low momentum fraction of the lepton spectrum through the VOI can be determined due to the approximately exponential energy distribution of the low-momentum lepton flux.

The total loss of the intensity is a sum of attenuation in each voxel. The attenuation coefficient is affected predominantly by the interactions with the atomic electrons. Thus, the parameter of total attenuation can be related to physical density distribution in the VOI by back projecting the spectrometrically filtered data.

The variance of the scattering distribution is proportional to the total path length of the muon trajectory. It can be shown that upon dividing the total path length into elemental path lengths d through an elemental volume (voxel) for a set of rays through the voxels, the variance is equal to the sum of the scattering density (the term defined as in L. J. Schultz, "Cosmic ray muon radiography," Ph.D. dissertation, Dept. Elect. Comput. Eng., Portland State Univ., Portland, Oreg., USA, 2003.) in each single voxel.

For a single completed trajectory, the total scattering angle is a sum of scattering angles in each voxel.

Hence, the total scattering angle is a sum of scatterings taking place in each voxel. Thus, the parameter of total scattering angle can be related to scattering density by back projecting the spectrometrically filtered data and using the defined completed trajectories in VOI. One can obtain a volume scattering distribution representing the coulomb scattering density variations in the VOI. Since there is no information about scattering angles per voxel available, one has to resort to dividing the total scattering angle equally between all the voxels the trajectory of the track it is passing through. Given the VOI is composed of mostly materials and elements with similar atomic number, one can assume that the scattering probability is not concentrated at a single location. FIG. 4 illustrates an example approach, where the value of total scattering angle $\alpha+\beta$ is equally distributed along the path of the constructed approximated trajectory vector CD to use in back projection. The same rules apply for track reconstruction based on any other measured parameters such as track counting (density) for transmission (attenuation) estimation.

Each voxel acts as a counter to collect parametric values used in back projection, which then represents the number of particles that pass through the specific voxel. This provides a hit map for the selected parameter (e.g. track density or scattering density map), where each voxel counts the selected parameter that actually passed through. It is to be noted that the volume density map is calculated by considering only the completed trajectories (i.e. trajectories reaching at minimum the first exiting detector panel on the output hodoscope).

Object detection in 2D plane is conducted on the input slices (voxel planes) with a single value assigned to each voxel. Averaging (denoising) and edge detection kernels have been adopted and applied for all voxel planes iteratively. Currently in the system we use Z plane to extract objects, however, X and Y and combinations of voxel planes can be used to extract the segmented image.

The objects can be detected in different ways when using different filtering parameters. For example, objects detected with muons and objects detected with electrons and low-momentum muons. The final binary object space is created by summing (superimposing) the results for each separate run.

Object labelling is done to assign a label to each individual object. An individual object is considered as set of voxels, with logical value "True" or 1 which are surrounded by background with logical value "False" or 0. Two voxels which share the same voxel side or edge are counted towards the same object. The object was labelled using iterative dilation, where a seed value is used to find the space occupied by the object. Binary object labelling can be done with different connected-component labelling methods.

After localisation, object tagging is done to assign a tag to each individual object based on their locations. An individual object is considered as set of voxels, with logical value "True" or 1, which are surrounded by background with logical value "False" or 0. Two voxels who share the same voxel side or edge are counted towards the same object. The location of the object was tagged using iterative dilation, where a seed value is used to find the space occupied by the object. The tagging of the location of the binary object can be done with different connected-component labelling algorithms.

Once a logical volume can be identified, the system extracts the content of the object as a histogram (also referred to as Probability Density Function—PDF). Bin width (h) and minimum ($a_{min}$) and maximum ($a_{max}$) range of the histogram is determined by the user, if these values are kept the same, this allows for direct histogram comparison.

The objects are detected with different filtering parameters. For example, an object can be detected with muons or it can be detected with electrons and low-momentum muons. The final binary object space is created by summing (superimposing) the results of each separate run. This is used in order to find pure/composite/compound objects.

Multiple parallel calculations with different back projection parameters for object reconstruction and identification, as described above, can be run, with different filtering values and combinations being selected which maximizes gradients in volume map distributions for that specific region of the VOI or an object. It means that different objects in the same volume and the same scan may be reconstructed with different filtering thresholds. Furthermore, it can be particularly advantageous to use one filtering condition for object size reconstruction and other filtering conditions for object recognition (identification). For object reconstruction, it can be advantageous to use more stringent filtering. For example, once the object size and location has been determined, particle trajectories with other filtering conditions can be used.

Using VOI Filtering in the Back Projection

So far, filtering in the hodoscopes has been described. The method of spectrometric angular filtering can be applied to the VOI in the same way as defined for filtering in hodoscopes. In this way one can use the effect of total scattering in VOI, that is dependent on the materials passed through and the momentum of the particle.

One can differentiate particle deflection taking place in the hodoscope and the deflection taking place in the VOI. Based on the deflection location it can be defined as either hodoscope filtering or VOI filtering. The deflection taking place in the hodoscope is in a fixed environment, and therefore statistically constant distribution. This is the preferred main filtering tool. The deflection taking place in VOI is not statistically constant, but can be used as another filtering tool, with or without hodoscope filtering. One way to define the filtering parameter in VOI (VOI filtering) is as an angle between vector BC in the input hodoscope (FIG. 4) and a vector on the output hodoscope or any other vectors describing the scattering processes in the VOI (e.g. angles between vectors BC and CD).

The effect of filtering in VOI for increasing the gradients in the VDM (volume density map) i.e. voxel intensity distributions is of advantage. A good horizontal cross-sectional image of the reconstructed VOI is obtained with hodoscope filtering condition 0-0.6 degree and VOI angular (angles between vectors BC and CD) on 0-4 degree or 0-2 degree. The filtering parameter is a mean angle of scattering angle per voxel (voxel side length 1 cm). In one example, for cellulose butyrate with detector spatial resolution 1 mm at different filtering conditions for upper and lower images, the estimated measurement time corresponding to natural flux rate is approximately 10 minutes.

In another example, a horizontal cross-sectional image of a reconstructed cube (30×30×30 $cm^3$) uranium VOI is obtained with hodoscope filtering condition 0-0.8 degree and VOI filtering (angles between vectors BC and CD) angle set on 0-3 degree and 0-60 degree. The filtering parameter is a mean angle of scattering angle per voxel with detector spatial resolution 1 mm and the estimated measurement time corresponding to the natural flux rate is approximately 18 minutes.

Selecting optimum filtering angles is preferably made automatically during the data processing for object reconstruction.

Increasing Accuracy in Discriminating Fraction of Highest Momentum Leptons by Assessment of Completed Trajectories and Applying the Trajectory's Deflection Correction One can also employ a 3D line fit to increase the accuracy of in determination of deflection angles in hodoscopes for high momentum leptons. The purpose of this method is to assign the track as non-deflected straight path for the corrected trajectories if the completed trajectory throughout the tomography system does not exceed a certain deviation threshold value from a fitted straight line. The chosen threshold value is linked to the detection accuracy of the deflection angles.

Due to limited accuracy of the physical hodoscope detector system, many non-deflected particle tracks appear as deflected in the hodoscope. It is statistically evident that, with high probability such tracks are caused by high-momentum muons. A large fraction of the muons within the region between angle 0-0.6 degree are shown with exaggerated deflection angle for the hodoscope system based on detector plates with 1.0 mm accuracy.

By applying an algorithm of trajectory's deflection correction (TDC) for completed trajectories, part of the particles flux from the angular distribution within certain threshold value are separated into a new group. A line is fitted through all the hits in the tomography procedure and the distance is measured between the hit location and the fitted line location on the hodoscope plane. If all distances are below a given threshold, the ray is considered as non-deflected.

The effect of increased performance in object reconstruction can be achieved by correcting the measured spectral angular distribution obtained in the hodoscope and adjusting it towards the statistically more probable result by assessing the trajectory throughout the entire tomography system. Correcting these trajectories, one reduces the variability of the VDM based on averaged value for total scattering angle per voxel and one achieves increased sensitivity for object reconstruction.

Object Reconstruction with Spectrometric Filtering and Application of TDC Algorithm.

A procedure of the reconstruction process with the aid of related algorithms can be summarised as follows:

Select spectral region(s) for completed trajectories by applying spectrometrical filtering of the cosmic ray flux;

Select/unselect option the Trajectory Deflection Correction algorithm;

Choose measured parametric value (e.g. counting completed trajectories, average scattering angle or other similar parameter) used for back projection;

Select track trajectory in the VOI;

Select/unselect filtering parameter for the VOI;

Back project projected tracks in the VOI based on the projected track trajectories;

Perform operation of segmentation separately for one or several filtered back projections with one of several parametric values;

Label or tag objects—compose logical volumes for the established detected objects;

Select/unselect—combine (superimpose) logical volumes from different object reconstructions and assign separated logical volumes representing reconstructed objects.

This starts with selecting spectrometric filtering, selecting/unselecting TDC, and selecting/unselecting VOI angular filtering for object reconstruction to create logical volumes and combined logical volumes.

Figure 8:
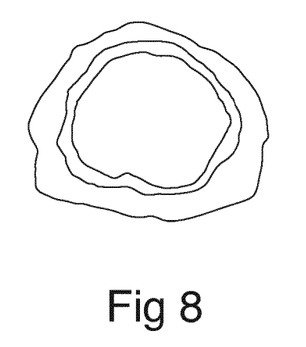
FIG. 8 shows object reconstruction of a double-object with spectroscopic filtering applied, (explosive material, cube of RDX ($10\times10\times10$ cm$^3$) centred in a $30\times30\times30$ cm$^3$ cube of muscle)
Figure 9:
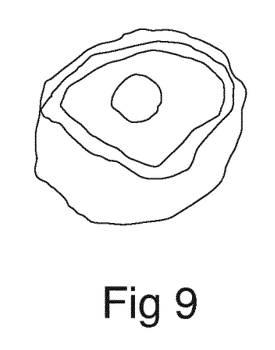
FIG. 9 shows an object reconstruction of a double-object with spectroscopic filtering and trajectory deflection correction algorithm applied (explosive material, cube of RDX ($10\times10\times10$ cm$^3$) centred in a $30\times30\times30$ cm$^3$ cube of muscle)
Figure 10:
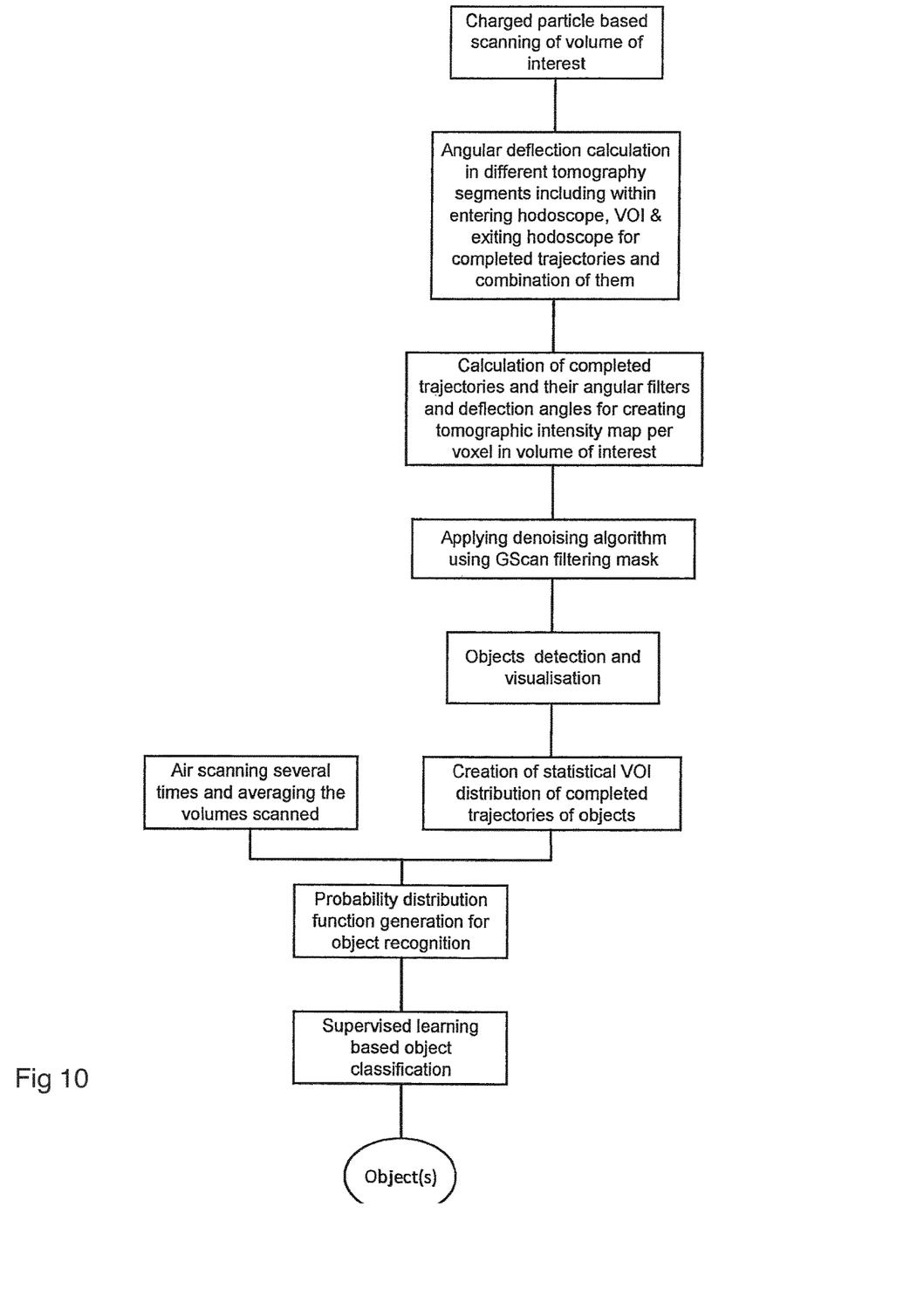
FIG. 10 is a flow chart of a method according to an embodiment of the invention.

The performance of the described reconstruction method is illustrated with different conditions in FIGS. 8 and 9 which show reconstruction of two cubes, cut in half for illustrational purposes—an explosive (type RDX) with dimensions 10×10×10 cm³ centred inside material composed of muscle (flesh) with a tomography as described in section "Description of the tomography". Estimated spatial resolution of a detector plane in the hodoscope is 1 mm. Object reconstruction is performed filtering hodoscope angular spectrum into three groups—0-0.6; 0.6-1.2; 1.2-90 degrees. Filtering in VOI was not applied. Multi-reconstructions have been performed for transmission and total scattering angle. Obtained VDMs were used to perform the object reconstruction as described in section "Object localisation and reconstruction".

In FIG. 8, the object reconstruction was performed without TDC, in FIG. 9 with TDC applied. Estimated real-time measurement duration approximately 18 minutes. One can notice that the proportions of the two objects are more accurately established with TDC applied.

Input hodoscope spectral filtering is important for efficient object reconstruction of low-Z materials; if spectral filtering is not applied a cube of water remains undetected. However, in case of high-Z material, detection of the uranium with the same size and shape can be exposed.

An advantage of the above methods and apparatus is that materials and articles can be accurately identified. In particular, material and articles composed of low-Z elements can be detected and identified within a limited time scale.

In detecting low-Z materials, all efforts are put to increase the detection sensitivity. Advantages of embodiments of the present invention include:

filtering and separating the entering cosmic ray flux in order to increase detection sensitivity for absorption (attenuation) effect and scattering effect and thereby increasing gradients in reconstructed volume density map;

less sensitivity to the momentum of the particles when using the scattering parameter for calculating volume density map;

application of image processing methods to enhance the image based on the volume density map for object localization and detection;

autonomous material identification for the detected objects by using trained data and machine learning.

Advantages over conventional x-ray systems for detection include the following: high penetration power; can see inside shielded objects (e.g. nuclear material shielded with lead and polyethylene or narcotics shielded with tanks of water); sensitivity for elemental composition; no restrictions for use in presence of humans.

Various modifications can be made to the described arrangements. For example, a different hodoscope can be used with higher estimated spatial resolution (down to 0.1 mm) of one detector plane. It is configured as the detector plane described above, but one-layer rectangular fibres are replaced with double-layered round scintillation fibres with diameter 1.0 mm. By applying pulse shape analysis and a dedicated tracking algorithm, one can increase the spatial resolution of the detector plane considerably.

The method and apparatus are applicable equally to positron detection as to electron and/or muon detection (i.e. with positive and negative charges).

The invention claimed is:

1. A method of detecting and/or identifying a material or article (52) in a volume of interest, the volume of interest including a plurality of voxels, the method including:
   a) detecting, with an input hodoscope (12, 16), charged particles entering the volume of interest;
   b) detecting, with an output hodoscope (14, 18), charged particles leaving the volume of interest (50);
   c) associating particles leaving the volume of interest with particles entering the volume of interest and determining therefrom a set of completed trajectories for the particles;
   d) performing filtering based on the deflection angles in the input and/or the output hodoscopes of the particles with completed trajectories;
   e) calculating a volume density map by using back projection of the filtered completed trajectories which passed through each respective voxel, the map representing a number of completed trajectories and/or a scattering angle; and
   f) detecting and/or identifying the material or article in the volume of interest from the volume density map,
   wherein in operations c, d and e the set of completed trajectories consists of completed trajectories having associated deflection angles within a specific range of deflections, and wherein the particles are leptons and the method includes selecting the range or ranges of deflection angles such that electrons and muons are at least partly separated.

2. The method of claim 1, wherein in step d) filtering is also performed based on the scattering angle of particles in the volume of interest (50).

3. The method of claim 1, including determination of a plurality of volume density maps using different sets of filtering parameters.

4. The method of claim 1, wherein volume density map calculation is undertaken using different back projection parameters.

5. The method of claim 1, further including:
g) defining a region of interest corresponding to the material in the volume of interest (50);
h) producing a first distribution function relating to the region of interest from the volume density map.

6. The method of claim 5, including:
i) recognising at least one feature of the first distribution function to identify the material in the volume of interest (50).

7. The method of claim 1, including selecting the range or ranges of deflection angles such that the electrons and low-momentum muons are separated from higher momentum muons.

8. The method of claim 1, wherein total deflection angles for completed trajectories within hodoscopes (12, 14, 16, 18) and the volume of interest (50) below a certain threshold are counted as non-deflected and treated as straightforward trajectories.

9. A detection and/or identification assembly (10) for leptons, including:
a) an input hodoscope (12, 16) adjacent a volume of interest (50), the volume of interest including a plurality of voxels and the input hodoscope being configured to detect charged particles entering the volume of interest;
b) an output hodoscope (14, 18) bounding the volume of interest, the output hodoscope being configured to detect charged particles leaving the volume of interest;
c) a processor configured to receive detection data from the input and output hodoscopes, the processor further being configured to:
1) associate particles leaving the volume of interest with particles entering the volume of interest and determine therefrom a set of completed trajectories consisting of completed trajectories having associated deflection angles within a specific range of deflections selected such that electrons and muons are at least partly separated;
2) perform filtering based on the deflection angles in the input and/or output hodoscopes of the particles with completed trajectories;
3) calculate a volume density map, by using back projection of the filtered completed trajectories which passed through each respective voxel, the map representing a number of completed trajectories and/ or a scattering angle; and
4) detect and/or identify a material or an article in the volume of interest from the volume density map.

10. A method of detecting and/or identifying a material or article (52) in a volume of interest, the volume of interest including a plurality of voxels, the method including:
a) detecting, with an input hodoscope (12, 16), charged particles entering the volume of interest;
b) detecting, with an output hodoscope (14, 18), charged particles leaving the volume of interest (50);
c) associating particles leaving the volume of interest with particles entering the volume of interest and determining therefrom a set of completed trajectories for the particles;
d) performing filtering based on the deflection angles in the input and/or the output hodoscopes of the particles with completed trajectories;
e) calculating a volume density map by using back projection of the filtered completed trajectories which passed through each respective voxel, the map representing a number of completed trajectories and/or a scattering angle, wherein volume density map calculation is undertaken using different back projection parameters; and
f) detecting and/or identifying the material or article in the volume of interest from the volume density map.

11. A detection and/or identification assembly (10), including:
a) an input hodoscope (12, 16) adjacent a volume of interest (50), the volume of interest including a plurality of voxels and the input hodoscope being configured to detect charged particles entering the volume of interest;
b) an output hodoscope (14, 18) bounding the volume of interest, the output hodoscope being configured to detect charged particles leaving the volume of interest;
c) a processor configured to:
1) receive detection data from the input and output hodoscopes,
2) associate particles leaving the volume of interest with particles entering the volume of interest and determine therefrom completed trajectories in the input and/or the output hodoscopes;
3) perform filtering based on the deflection angles of the completed trajectories;
4) calculate a volume density map, by using back projection of the filtered completed trajectories which passed through each respective voxel, the map representing a number of completed trajectories and/ or a scattering angle, wherein volume density map calculation is undertaken using different back projection parameters; and
5) detect and/or identify a material or an article in the volume of interest from the volume density map.

12. A detection and/or identification assembly (10), including:
a) an input hodoscope (12, 16) adjacent a volume of interest (50), the volume of interest including a plurality of voxels and the input hodoscope being configured to detect leptons entering the volume of interest;
b) an output hodoscope (14, 18) bounding the volume of interest, the output hodoscope being configured to detect leptons leaving the volume of interest;
c) a processor configured to:
1) receive detection data from the input and output hodoscopes,
2) associate leptons leaving the volume of interest with leptons entering the volume of interest and determine therefrom completed trajectories in the input and/or the output hodoscopes;
3) perform filtering based on the deflection angles of the completed trajectories;
4) calculate a volume density map, by using back projection of the filtered completed trajectories which passed through each respective voxel, the map representing a number of completed trajectories and/ or a scattering angle; and
5) detect and/or identify a material or an article in the volume of interest from the volume density map,
wherein the set of completed trajectories consists of completed trajectories having associated deflection angles within a specific range of deflections, and wherein the method includes selecting the range or ranges of deflection angles such that electrons and muons are at least partly separated.

* * * * *